(12) United States Patent
Burrows

(10) Patent No.: US 6,331,094 B1
(45) Date of Patent: Dec. 18, 2001

(54) WHEEL CHOCK FOR USE IN TRANSPORTING A CYCLE ON A VEHICLE

(75) Inventor: Ward C. Burrows, Pasadena, CA (US)

(73) Assignee: Ancra International, LLC., Hawthorne, CA (US)

( * ) Notice: Subject to any disclaimer, the term of this patent is extended or adjusted under 35 U.S.C. 154(b) by 0 days.

(21) Appl. No.: 09/690,148

(22) Filed: Oct. 17, 2000

(51) Int. Cl.$^7$ ..................................................... B06P 7/08
(52) U.S. Cl. ..................................... 410/30; 410/3; 410/8
(58) Field of Search ................................. 410/3, 7, 8, 9, 410/19, 30; 188/32; 224/537, 571, 924; 414/462

(56) References Cited

U.S. PATENT DOCUMENTS

| | | | |
|---|---|---|---|
| 1,776,935 | * | 9/1930 | Snyder .................................... 410/30 |
| 1,780,277 | * | 11/1930 | Seeley et al. ............................ 410/8 |
| 2,829,738 | * | 4/1958 | Vasquez .................................. 188/32 |
| 2,858,905 | * | 8/1958 | Fahland .................................. 410/30 |
| 3,779,517 | | 12/1973 | Fisher . |
| 3,785,517 | | 1/1974 | Brajkovich . |
| 5,037,255 | * | 8/1991 | Bullock et al. ......................... 410/30 |
| 5,462,398 | | 10/1995 | Hymer . |
| 5,899,655 | | 5/1999 | Miller et al. . |
| 6,065,914 | * | 5/2000 | Fotou ..................................... 410/3 |

* cited by examiner

Primary Examiner—Stephen T. Gordon
(74) Attorney, Agent, or Firm—Edward A. Sokolski

(57) ABSTRACT

A wheel chock is formed from a bar which is bent to form opposing bottom arms; a first pair of opposing side arms which run above the bottom arms and are slightly upturned therefrom: a second pair of opposing side arms which run upwardly from the first pair of side arms; and cross arms forming a top portion which runs between the second pair of side arms. A base plate is attached to the bottom arms, this base plate having studs attached thereto and extending from the bottom thereof. The studs fit into a track fixedly attached to the floor of a transporting vehicle which may be an aircraft or a truck. A central plunger latching member which is spring loaded also extends from the bottom of the base plate and latches the plate to the track. The chock can thus be installed in and removed from the track merely by manually positioning the latching member. A wheel of the cycle is fitted into the chock with its lower portions kept from moving sideways by the side arms of the chock and with the middle portion of the wheel prevented from moving longitudinally in a forward direction by the cross arm.

8 Claims, 2 Drawing Sheets

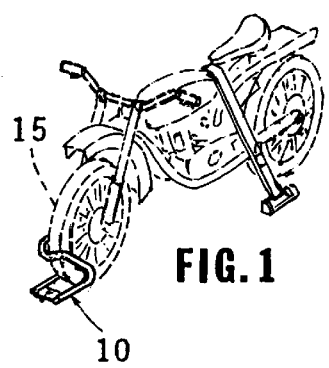
FIG. 1
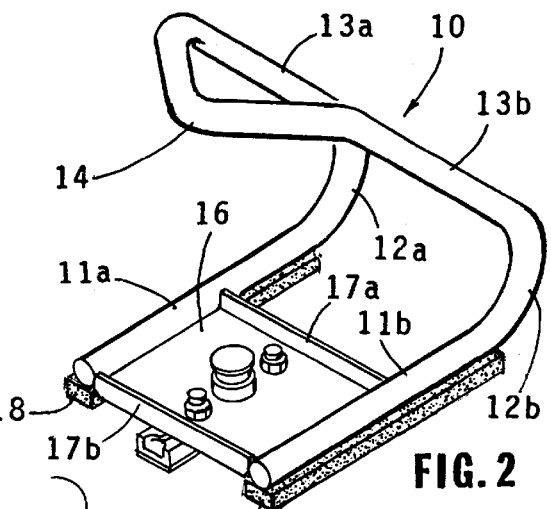
FIG. 2
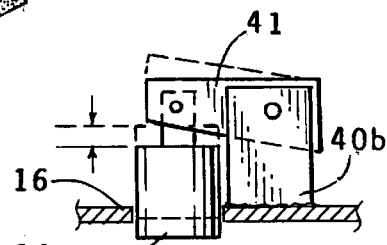
FIG. 3
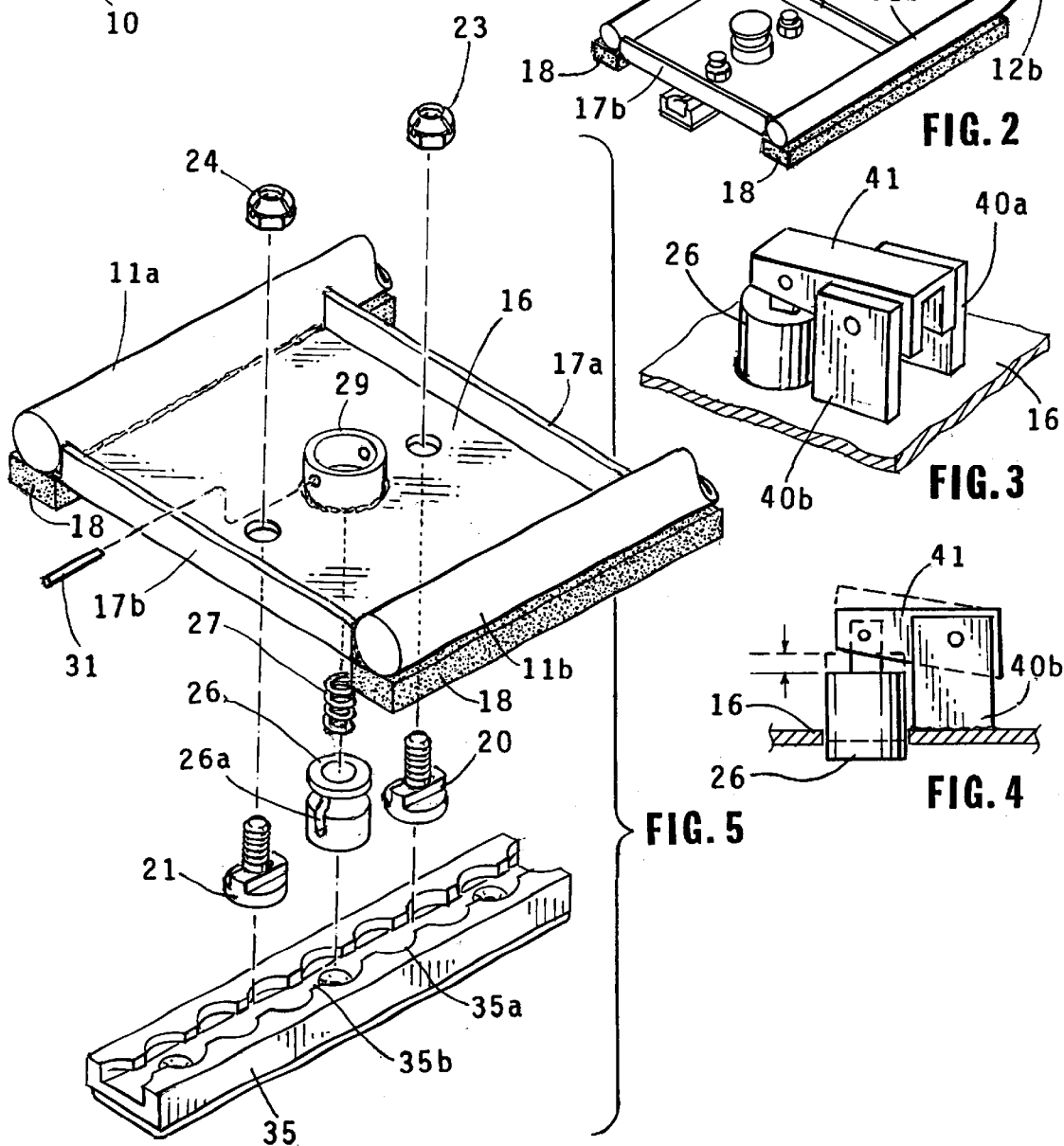
FIG. 4
FIG. 5

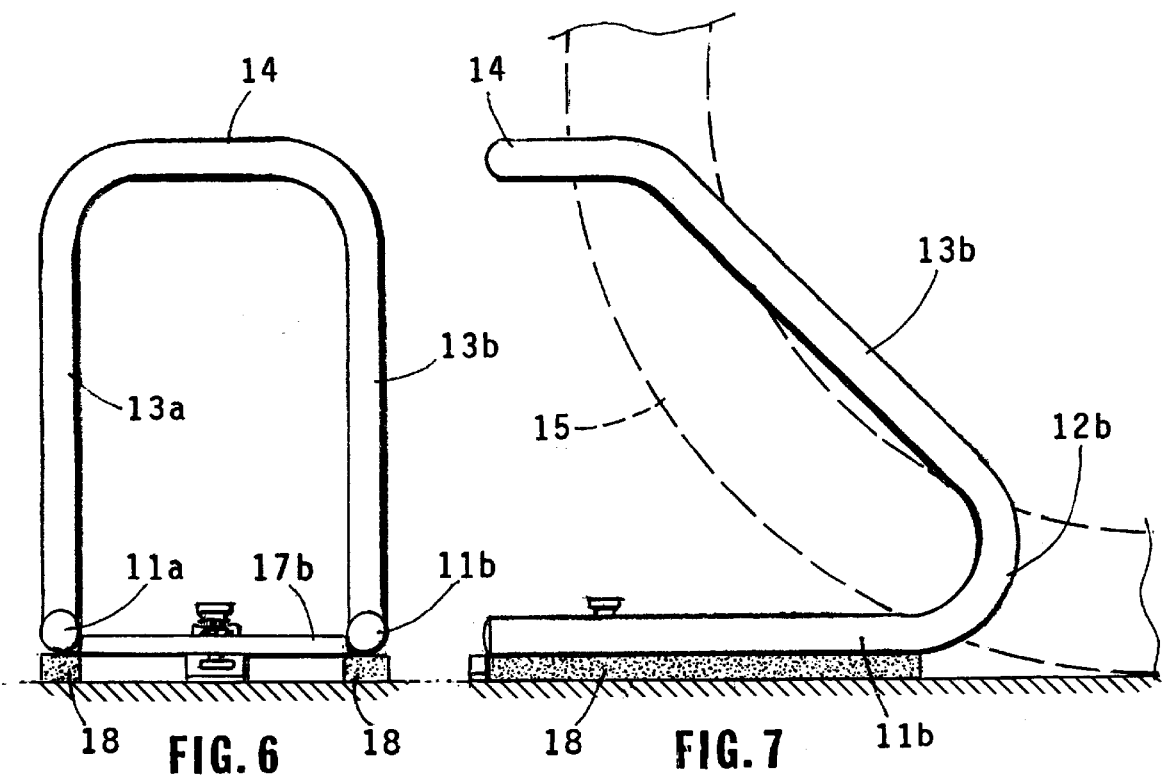
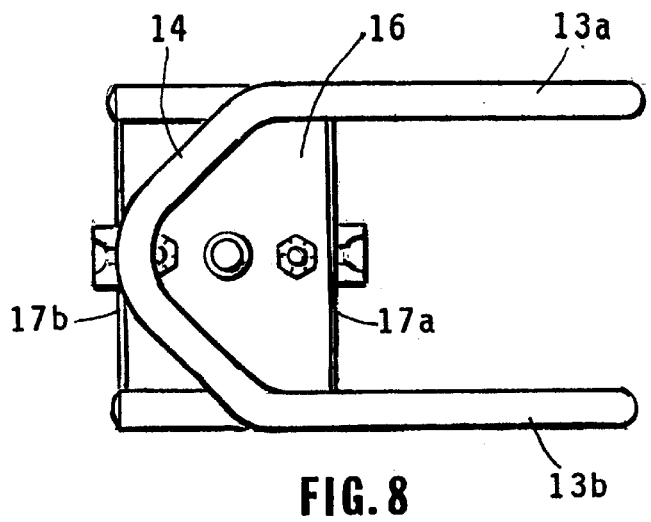

WHEEL CHOCK FOR USE IN TRANSPORTING A CYCLE ON A VEHICLE

BACKGROUND OF THE INVENTION

1. Field of the Invention

This invention relates to a wheel chock for retaining a cycle for transportation on a vehicle and more particularly to such a device which is removably mounted on a track on the floor of the transporting vehicle.

2. Description of the Related Art

Chocks are commonly employed to support cycles such as motorcycles for transportation on a vehicle such an aircraft or A truck. A typical such device is described in U.S. Pat. No. 3,785,517 issued Jan. 15, 1974 to Brajkovich. Such prior art devices while effective in retaining the cycle in position during transportation tend to be overly expensive in their construction. Further, they cannot as readily be removed and reinstalled as to be desired. This factor is of particular importance in aircraft transportation where the goods being transported varies from day to day and the compartment must be modified as need be to handle each type of goods. The device of the present invention overcomes these shortcoming by providing a device of simple and economical construction which can rapidly and easily be installed and removed from a transportation compartment.

SUMMARY OF THE INVENTION

The device of the present invention is formed from a bar which is bent into a formation which includes a pair of opposing bottom arms which form a base and a first pair of opposing side arms spaced above the bottom arms which run slightly upturned from the bottom arms. Extending upwardly from the first pair of side arms are a second pair of opposing side arms, the top ends of the second pair of side arms being joined together by a cross arm forming a top piece.

A substantially flat base plate is fixedly attached to the bottom arms. The base plate has a pair of longitudinally spaced studs attached thereto, these studs fitting into a receptacles in a track installed on the floor of the transportation compartment. A spring loaded plunger is located between the two studs, this plunger being driven by the spring into a receptacle in the track. With the studs and the plunger installed in the track, the chock is held firmly to the vehicle floor. The chock can be released from the track merely by pulling upwardly on the plunger and sliding the chock longitudinally and lifting upwardly.

It is therefore an object of this invention to provide an improved chock for retaining a cycle in place for transportation on a vehicle;

It is a further object of this invention to provide a chock for use in retaining a cycle in place for transportation on a vehicle which can more readily and rapidly be installed in and removed from such vehicle;

Other objects of the invention will become apparent as the description proceeds in connection with the accompanying drawings.

DESCRIPTION OF THE DRAWINGS

FIG. 1 is a top front perspective view of a bicycle installed in a preferred embodiment of the device of the invention;

FIG. 2 is a top front perspective view of the preferred embodiment;

FIG. 3 is a top perspective view of a device for use in securing and releasing the plunger of the preferred embodiment;

FIG. 4 is a side elevational plan view of the device of FIG. 3;

FIG. 5 is an exploded perspective view of the base plate of the preferred embodiment illustrating its attachment to a floor track;

FIG. 6 is a front elevational view of the preferred embodiment shown installed in a floor track;

FIG. 7 is a side elevational view of the preferred embodiment installed in a floor track; and FIG. 8 is a top plan view of the preferred embodiment installed in a floor track.

DETAILED DESCRIPTION OF THE INVENTION

Referring now to FIGS. 1,2, and 5–8, a preferred embodiment of the invention is illustrated. The chock 10 is used to support the wheel of a motorcycle 15 on the floor of a transporting vehicle. The main portion of the chock 10 is fabricated of a single piece of bar metal which is formed in the indicated shape. A pair of opposing bottom arms 11*a* and 11*b* form a portion of the base for the device. Directly above the bottom arms and spaced from each other in opposing relationship are a first pair of side arms 12*a* and 12*b* which are curved and run slightly upturned from the bottom arms. Extending upwardly from the first pair of side arms is a second pair of opposing side arms 13*a* and 13*b* which are substantially straight. Connecting the side arms together is a top arm 14 which has a "V" shape and forms a top piece.

Attached to the bottom arms 11*a* and 11*b* is base plate 16. Foam rubber backings 18 are installed under each of arms 11*a* and 11*b*. Base plate 16 has a pair of in line studs 20 and 21 extending from its bottom wall and attached thereto by means of nuts 23 and 24. Spaced about half way between the studs is plunger 26 which is urged downwardly by spring 27. Cylindrical member 29 is fixedly attached to the wall of plate 16. The top portion of plunger 26 fits through cylindrical member 29, the plunger being retained to member 29 by means of pin 31 which fits through opposing apertures formed in member 29 and opposing elongated slots 26*a* formed in the plunger. The spring is retained between pin. 31 and the base portion of plunger 26 thereby urging the base of the plunger into an opening 35*a* in track 35.

Studs 20 and 21 fit into track 35 which is attached to the floor of the stowage compartment. This type of track is typically used in aircraft for attaching seats, cargo, etc. to the floor of the aircraft. The studs are installed in a pair of openings 35*a* and then laterally slid under the narrower openings in the track(i.e. under the ledge portions 35*b*). The plunger which is positioned so that with the studs under the ledge portions fits into an opening 35*a* is then released so it drops into the opening where it acts to retain the studs in position under the ledge portions. The chock is thus firmly retained in position. A pair of stiffening ribs 17*a* and 17*b* are formed by upwardly bending the opposite ends of plate 16.

Referring to FIGS. 3 and 4 a device for facilitating the raising and lowering of the plunger is illustrated. This device is in the nature of a "butterfly" valve and includes a pair of oppositely positioned supports 40*a* and 40*b* on which an arm 41 is pivotally supported. Arm 41 thus can be manually actuated to drive the plunger 26.

While the invention has been described and illustrated in detail, it is to be understood that this is intended by way of illustration and example only, the scope of the invention being limited by the terms of the following claims.

I claim:

1. A wheel chock for retaining a cycle on the floor of a vehicle for transportation thereon comprising:

a bar bent to form opposing bottom portions, opposing side portions and a top portion;

a substantially flat plate forming a base attached to said bar bottom portions;

a pair of longitudinally spaced studs attached to said plate and extending from the bottom surface thereof;

a plunger attached to said plate and longitudinally spaced from said studs and extending from the bottom surface of said plate; and a track having a plurality of openings formed therein with opposing ledges formed between each of said openings;

said spaced studs fitting into said track openings and being positionable under said ledges, said plunger being positionable in one of said openings when said studs are positioned under the ledges, thereby removably retaining said plate to said track.

2. The wheel chock of claim 1 wherein said side portions of said bar comprise a first pair of side portions which run slightly upturned from the bottom portions and a second pair of side portions which extend upwardly from the first pair thereof.

3. The device of claim 1 and further including a spring for urging said plunger downwardly.

4. The device of claim 3 and further including arm means supported on said plate for use in urging said plunger downwardly.

5. The device of claim 1 and further including opposing ribs extending from opposite ends of said plate and running between said bar bottom portions.

6. A wheel chock for retaining a cycle for transportation on the floor of a vehicle comprising:

a pair of opposing bottom arms forming a base;

a first pair of opposing side arms spaced from and above the bottom arms which run slightly upturned from the bottom arms;

a second pair of opposing side arms which extend upwardly from the first pair of side arms;

a cross arm forming a top piece joining top ends of said second pair of side arms together;

a substantially flat plate attached to the bottom arms; and means for removably mounting said base plate on the floor of the vehicle.

7. The wheel chock of claim 6 wherein the means for removably mounting said base plate on the floor of the vehicle comprises a pair of longitudinally spaced studs and a spring actuated plunger positioned between said studs, said studs and plunger being attached to said base plate and extending from the bottom surface thereof, and a track for installation on the floor of the vehicle, said studs and plunger being removably installed in said truck thereby retaining said base plate thereto.

8. The device of claim 6 and further including a pair of oppositely positioned ribs formed on opposite sides of said plate and running between said bottom arms.

* * * * *